FIGURE 2 is a perspective view partly in section of a tile, brick or floor covering showing the use of the binder sealant of the present invention;

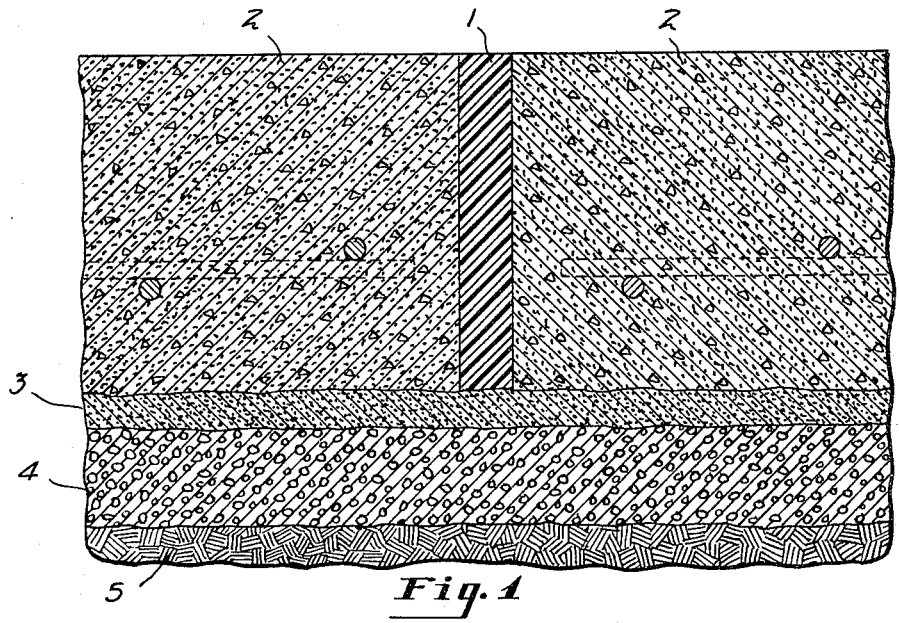
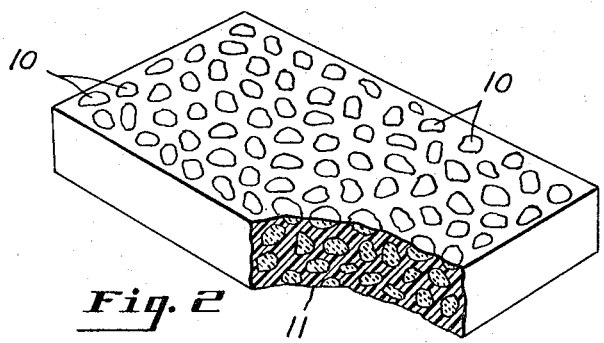
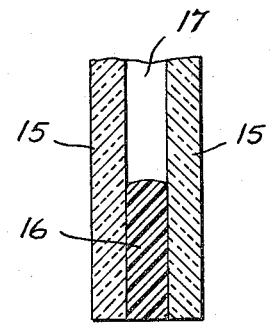
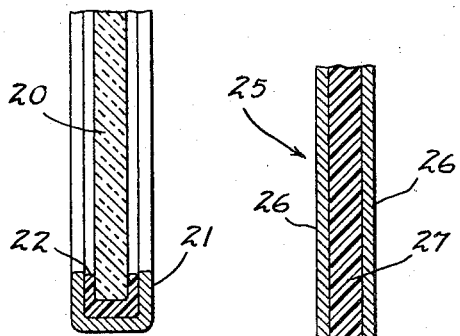
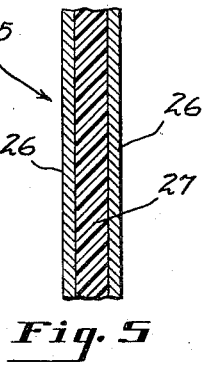
INVENTORS
Robert M. Evans
Bernardas Brizgys ion of a concrete pavement of a road showing the use of the composition of the present invention;

FIGURE 3 is a sectional view of a portion of a thermal type insulating window pane using the sealant of the present invention;

FIGURE 4 is a sectional view of a portion of a window sash using the present sealant; and FIGURE 5 is a sectional view of a portion of a metallic wall or ceiling panel utilizing the present sealant.

According to the present invention, it has been found that if a bituminous substance be used which has a relatively low moisture content and which is pre-reacted with a polyisocyanate and then the intermediate product resulting therefrom is mixed with a polyurethane prepolymer, the final product has excellent package stability, good adhesion to wet concrete, better physical properties than the polyurethane prepolymer without the bituminous-isocyanate adduct, and useful rheological properties of kinds not possessed by the polyurethane prepolymer itself. At the same time, material costs are substantially reduced as a result of the use of relatively large amounts of bitumens, which are ordinarily low in price. When this mixture is exposed to the atmosphere it is vulcanized or cured by water vapor. Moreover, it is possible to produce the product or mixture in a single operation.

As shown in FIGURE 1 of the drawing sealant 1 of the present invention has been applied as a joint between concrete blocks 2—2 which are supported by packed sand layer 3 and aggregate or rock layer 4 of roadway 5, which may be of clay or other suitable road base material. In FIGURE 2 of the drawing, there is shown a floor tile or section of a flooring in which bits of rock 10—10 such as chips of quartz, marble or shale, etc. have been mixed with composition 11 of this invention, cast, troweled and cured. The tiles can be molded as such and laid individually in a sealant of this invention or can be cast in place over concrete, wood or other subflooring. After curing, the tile or floor can be polished or its surface made smooth, if desired. FIGURE 3 shows an insulating type window pane in which two pieces of glass 15—15 are secured together at least along their inner edges by means of sealant 16 of the present invention to form deadair space 17 which can be partially exhausted, filled with dry air and so forth. FIGURE 4 discloses a piece of glass 20 secured in metal channel 21 of a window sash by means of sealant 22 of the present invention. FIGURE 5 discloses wall panel 25 comprising metal sheets such as steel sheets 26—26 secured together by the present sealant 27. Essentially all of the space between sheets 26—26 may be filled with sealant 27 or if desired only a portion may be filled with sealant to secure the sheets together.

THE BITUMINOUS ADDUCT

The bituminous substance employed in the practice of the present invention can be any natural or synthetic bituminous substance (bitumen, pyrobitumen, asphalt, asphaltite, asphaltic pyrobitumen, nonasphaltic pyrobitumen, tar and/or pitch) containing asphaltene or tar-like components. For example, there can be used pine tar or tar which is used for cutting hard resins, coal tar, coke oven or gas plant tar, road tars or oils, pitches, roofing pitches, other coal tar fractions, cracked, straight run or natural asphalts, petroleum distillation residues and asphalts, cut asphalts, albino asphalts and so forth as well as synthetic bituminous substances. Examples of many bituminous substances which can be used are shown in the book by Abraham, "Asphalts and Allied Substances," D. Van Nostrand Co., Inc., New York, 5th ed., vol. 1, 1945, especially pages 56–69. Still other materials can be used such

---

3,372,083
COMPOSITIONS AND ARTICLES FROM THE REACTION OF AN ISOCYANATE TERMINATED POLYURETHANE AND THE ISOCYANATE ADDUCT OF BITUMEN
Robert M. Evans, Chesterland, and Bernardas Brizgys, Lyndhurst, Ohio, assignors to The Master Mechanics Company, Cleveland, Ohio, a corporation of Ohio
Filed Mar. 11, 1964, Ser. No. 351,065
20 Claims. (Cl. 161—190)

ABSTRACT OF THE DISCLOSURE

Floor tile, and caulking for glass and concrete containing a polyurethane, cured by water from the air to a solid having an elongation capacity greater than 100%, is made from the reaction of an isocyanate terminated prepolymer and the isocyanate adduct of an unmodified tar. This may be prepackaged in a single container and hardened only when exposed to the moisture from the air at the point of use. Also chlorinated hydrocarbons and organic silicones may be included. The caulking materials may be applied to wet joints.

---

This invention relates to compositions suitable for use as construction joint sealants, caulking compounds, roofing materials or the like, specifically a composition of this kind lending itself to shipment, sale and application in ready-to-apply single package form without any particular requirement for mixing at the point of use and to articles made with such compositions.

In the past, compositions have been suggested for pavement joints and the like consisting largely of two principal ingredients mixed at the point of use, one of them a polymeric material and the other a bituminous material such, for example, as a petroleum residue, a coke oven tar or a natural asphalt. Generally, the nature of these compositions is such as to require that a curing agent be included with the bituminous portion to solidify the polymeric material. From the standpoint of the user, mixing at the point of application is a disadvantage, as for example, when it requires the use of elaborate proportioning apparatus and skilled attendants to operate it. In many cases, the compositions have a decided tendency to foam; in others, even if there is no foaming, the products have relatively poor physical properties, particularly as regards strength, elongation and adhesion to wet surfaces.

An even more serious weakness has characteristically resided in the inability of such compositions to bond tenaciously to new concrete of high water content or old concrete wetted down by rain or melting snow.

Accordingly, it is an object of the present invention to provide sealants, caulking compounds and roofing materials and the like characterized by their ability to be easily applied, by general freedom from foaming, by having improved physicals, and by having improved dry and wet adhesive strength to concrete.

Another object of this invention is to provide products or articles of manufacture in which the parts or elements are secured in place by the sealant or composition and the like of the present invention.

Another object is to provide a method for making a composition useful as a sealant, caulking compound, roofing material and so forth.

These and other objects and advantages of the present invention will become more apparent to those skilled in the art from the following detailed description, examples and drawing in which:

FIGURE 1 is a vertical cross sectional view of a poras the high boiling tar acids which may be obtained by treating tars with caustic, neutralizing, and fractionating to get the portion boiling between about 195–340° C. containing relatively a high percentage of beta naphthol, resorcinol, and a small amount of xylenol and other substances (the lower boiling fraction, 210–225° C., contains xylenol, phenols and so forth). The high boiling tar acids are useful in making light colored or white products. Aromatic resins such as coumarone-indene polymers or resins, chlorinated biphenyl, cyclic unsaturated petroleum resins and the like which contain, or to which have been added high boiling tar acids can also be used. Thus, the bituminous substances can be naturally occurring substances, or their derivatives or by-products, synthetics, or they may be the products or by-products of the chemical, coal, petroleum or steel industries and so forth. It is preferred that the bituminous substance be a liquid at temperatures of from about 0 to 100° C. although viscous or solid bituminous substances can be used which can be made more fluid or be melted at a temperature up to about 400° C. or which are soluble in solvents.

Blown asphalts or aliphatic bituminous materials, mineral waxes and so forth are not too desirable but can be used in minor amounts with the preferred bituminous substances. Some of the natural asphalts, tars and pitches may contain mineral matter and can be purified by freeing them of such matter although in some cases they can be used as such since the mineral matter either as colloidal clays or finely divided particles of sand serve as fillers provided that they are not present in an amount of over 200 to 300% by weight of the bituminous substance. However, it is preferred that the bituminous substance be free initially of mineral matter.

The bituminous substance may contain water in an amount up to about 1.0% preferably up to 0.5% by weight as free, absorbed or occluded water to obtain consistent results. $H_2O$ may be absorbed from the atmosphere. Also, the bituminous substance should have active hydrogen atoms, that is hydrogen atoms because of their position in the molecule display activity according to the Zerewitinoff Test as described by Kohler in J. Am. Chem. Soc. 49, 3181 (1927). The active hydrogens can be part of phenolic or alcoholic hydroxyls, thiols, amines, carboxyl radicals and the like. Preferred bituminous substances are those such as the coal tars having a high content of high boiling phenolics and a low content of low boiling phenols. Mixtures of bituminous substances can be used.

The organic isocyanate used to react with the bituminous substance may be any isocyanate having 1, 2, 3, or more functional or reactive isocyanato groups. It may be an aromatic, aliphatic or aliphatic-aromatic compound. The preferred isocyanates are polyisocyanates. Examples of useful isocyanates which may be employed are phenyl isocyanate, tolylene diisocyanate, p,p′-diisocyanato diphenylmethane, dimethyl diphenylmethane diisocyanate, bitolylene diisocyanate, dibenzyl diisocyanate, durene diisocyanate, diphenyl dimethyl methane diisocyanate, 4-tertbutyl-2,6-tolylene diisocyanate, hexamethylene diisocyanate, 4-isopropyl-2,6-tolylene diisocyanate, naphthalene-1,5-diisocyanate, naphthalene triisocyanate, dichlorodiphenyl methane diisocyanate, metaphenylene diisocyanate, paraphenylene diisocyanate, diphenylene ether diisocyanate, tolylene diisocyanate dimer, and polyaryl polyisocyanates such as the reaction product of aniline and formaldehyde which has been reacted with phosgene (Mondur MR, Mobay Chemical Co., Pittsburgh, Pa.), "PAPI" (The Carwin Company, North Haven, Conn.) having the general formula:

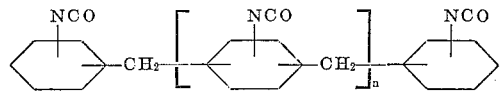

where $n$ has an average value of 1. Still other polyisocyanates can be employed. Mixtures of polyisocyanates can be used, for example, an 80–20 or 65–35 mixture of 2,4- and 2,6-tolylene diisocyanates or other polyisocyanate mixtures can be used. It will be appreciated that, where isocyanates are used having more than two isocyanato groups, care should be observed to avoid too much cross-linking which might give an undesirable increase in viscosity of the bituminous substance or make it a solid or gel. If the bituminous substance has a sufficiently high molecular weight or high isocyanate equivalent this problem may not be too serious.

Isocyanates which are preferred for reaction with the bituminous substances are organic diisocyanates having at least 6 carbon atoms up and to a total of 18 carbon atoms in a chain between isocyanato groups. The chain may be part of an aliphatic chain or of a cyclic or aromatic ring. A portion, 1 to 4, of the total hydrogen atoms of the total of these carbon atoms may be substituted with halogen atoms, i.e., Cl, Br, I and/or F atoms. Examples of such diisocyanates are hexamethylene diisocyanate, octamethylene diisocyanate, decamethylene diisocyanate, 3-propyl hexamethylene diisocyanate, p,p′-diisocyanato diphenyl methane diisocyanate or 4,4′-methylene bis (phenyl isocyanate), dimethyldiphenyl methane diisocyanate, bitolylene diisocyanate-2,2, dibenzyl diisocyanate-2,2, p,p′-diisocyanato diphenyl propane, dichloro diphenyl methane diisocyanate, 2,6-naphthalene diisocyanate, 1,18-octadecyl diisocyanate and so forth. These compounds can be represented by the formula

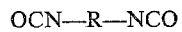

where R is selected from the group consisting of hydrocarbons and hydrocarbons having from 1 to 4 halogen atoms and where there are from 6 to 18 carbon atoms in a chain between the isocyanato groups.

The isocyanate is used in an amount sufficient to react with a substantial amount of the water present in the bituminous substance and may also react with the active hydrogen atoms of the bituminous substance groups so the mixture of bituminous-isocyanate adduct and polyurethane prepolymer will not gel. It is preferable to have enough active hydrogen remaining so that the bituminous adduct consumes some of the free isocyanate of the prepolymer. If too much isocyanate is reacted with the bituminous substance, the resulting mixture of bituminous-isocyanate adduct and polyurethane prepolymer will cure to too stiff a product to be a suitable adhesive, sealant or caulking compound etc. For example, when using p,p′-diphenylmethane diisocyanate from 4 to 8 parts by weight of this diisocyanate per 100 parts by weight of a bituminous substance having 0.5% by weight of water produces the best results. Hence, for 0.56 equivalent of water, between 0.32 and 0.64 equivalent of MDI, produces the best results here. Some of the phenolic groups in the bitumen are obviously left unreacted. In any event the free isocyanate in said isocyanate-bituminous adduct should not exceed about 2% by weight. While the adduct does not need to have free NCO the bituminous substance should have some $H_2O$ and sufficient isocyanate to neutralize at least a substantial amount of the $H_2O$, for if no $H_2O$ is present, the phenol in the bitumen will prevent the prepolymer from curing and also make it incompatible with the prepolymer.

The bituminous substance and the isocyanate are reacted together in an enclosed vessel, reactor and so forth under an atmosphere of an inert or non-reactive gas, such as nitrogen, argon, helium, etc. i.e., an atmosphere free of water vapor or other material reactive with NCO groups. Heat is applied as necessary to speed the reaction. The temperatures involved will depend upon the speed of reaction of the polyisocyanate. Heat may also be applied to soften or melt the bituminous substance.

However, the temperature should not be so high as to cause decomposition of the urethane linkages formed. In general, a temperature of about 100° C. represents a maximum temperature. Where the reaction in temperature is too high, cooling means may be used. The time of reaction will vary depending on the amount of materials used, reaction speeds of the bituminous substance and isocyanate, temperature and so forth. Solvents are desirably employed for the purpose of dissolving the reactants to facilitate mixing and promote better reaction conditions. Solvents, also, aid in temperature control. The amount of solvent used will depend on the amount of material involved, the desired fluidity of the mass mixing conditions and so forth.

It is often desirable to add pigments, flow control agents, etc. to the iscyanate when reacting with bitumen, because this will neutralize isocyanate reactive functions on the surface of these materials.

The resulting bituminous-isocyanate adduct is a low or high viscosity liquid or solid depending on the reactants employed. When solvents are used, the adduct is in the form of a low or high viscosity liquid.

THE POLYURETHANE PREPOLYMER

The polyurethane prepolymer can be any polyurethane prepolymer which cures in the presence of moisture to form an elastomer having a minimum elongation of about 150%. Preferred polyurethane prepolymers are those which are liquids at temperatures of from about 25° to 100° C. or at least thermoplastic and fusible at temperatures up to about 300° C. or below the decomposition point of the polyurethane. It, also, is desirable that they be soluble or at least partly soluble in solvents for mixing with the bituminous-isocyanate adduct.

These prepolymers are the reaction products of polyols such as polyetherpolyols, polyesterpolyols, polyetheresterpolyols, polyester amide polyols, castor oil and so forth with organic polyisocyanates.

The polyether polyols employed in making the prepolymer may be obtained from alkylene oxides, substituted oxetanes, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula $HO(-CH_2-CH_2-CH_2-CH_2-O-)_nH$, where $n$ is an integer. Glycols may also be polymerized in the presence of mineral acids, sulfonic acid or Fuller's earth. Still other methods well known to those skilled in the art may be utilized in the preparation of these polyalkyleneether glycols. The linear polyalkyleneether glycols have at least two carbon atoms in their alkylene groups and can have as high as 8 or more carbon atoms in their alkylene groups. Useful examples of polyether glycols are polyethylene glycol, polypropylene ether glycol, polyethylene-propylene ether glycol, polytetramethylene ether glycol, polypentamethylene ether glycol, polyhexamethyene ether glycol, poly-1,6-octamethylene ether glycol and the like and mixtures thereof.

Branch chain polyether polyols may be obtained by reacting glycols or alkylene oxides or mixtures thereof and the like with materials such as sucrose, sorbitol, styrene vinyl alcohol copolymers, hexantriol, pentaerythritol, glycerol, phloroglucinol, trimethylol phenol, trimethylol benzene, trimethylol propane, amines such as ethylene diamine, triisopropanol amine, ethanolamine, diethylene triamine, and the like in the presence of suitable catalysts. In making the branched chain polyether polyols, from about 0.01 to 10 mol percent of the polyhydric alcohol such as glycerol is used based on the total of the glycerol and glycol and alkylene oxide or other cyclic oxide. With an alcohol having a large number of OH groups such as sorbitol, it should be used in a very small amount and the resulting polymer should have an average molecular weight of from 3,000 to 4,000 to get elastomeric properties. With glycerol, it can be used in larger amounts and the resulting polymer can have a molecular weight of 1,500 to 2,000. A method for the preparation of branched chain polyols is shown in the U.S. Patent to Price, No. 2,866,774 of Dec. 30, 1958.

Polyesters or polyester polyols also can be used for reaction with the polyisocyanates to form the polyurethane prepolymers. The polyesters should be mostly linear and hydroxyl terminated; they should have an acid number of less than 10 and preferably less than 3. The polyester is normally prepared by the esterification of at least one aliphatic dibasic acid or an anhydride thereof with at least one glycol. Ratios of more than one mole of glycol to acid are used so as to obtain chains containing a preponderance of terminal hydroxyl groups. The acids used in making the linear polyesters are generally aliphatic dicarboxylic acids having the formula HOOC—R—COOH where R is an alkylene radical having from 2 to 8 carbon atoms. Preferably, these acids have the formula $HOOC(CH_2)_xCOOH$ where $x$ is a number from 3 to 8. Acid anhydrides and the dimer acids including those from polymerized vegetable oils also can be used. Mixtures of acids and their anhydrides may be employed. Some examples of dicarboxylic acids are adipic, succinic, pimelic, suberic, azelaic and sebacic acids. The glycols used in making the linear esters generally contain from 4 to 10 carbon atoms. Preferably, in making linear polyesters, the glycols have the formula $$HO(CH_2)_yOH$$

where $y$ is a number from 2 to 8. Mixtures of the glycols can be employed and examples of useful glycols are ethylene glycol, butanediol-1,4, hexamethylenediol-1,6, octamethylenediol-1,8 and the like. The polyesters can also be made by transesterification and other processes. Mixtures of polyesters can be employed.

Where branch chain polyesters are desired, they may be obtained by the reaction of polyols such as glycerol, hexanetriol, pentaerytritol and the like with dicarboxylic and other polycarboxylic acids (trimellitic acid, trimesitinic acid, ethylene dimalonic acid, and so forth). These branched chain polyesters can be made in the same fashion as the branched chain polyetherpolyols but in addition sufficient poly functional acid or alcohol is used to achieve the required crosslink density.

The polyester, also, can be made with minor amounts of diamines or amino alcohols (ethylene diamine, ethanolamine and so forth) to provide the polyester with a small number of amide linkages and amine termination. However, the diamines or amino alcohol should be used in the amount of 25 mole percent or less so that the polyester contains a preponderance of ester linkages and a minor amount of amide linkages and is considered to be a polyester.

The glycerides of ricinaleic acid, caster oil, alkyd resins etc., can also be reacted with polyisocyanates to provide polyurethane prepolymers.

It is preferred that the polyether, polyester, or polyesteramide polyols when used contain a substantial number of carbon linkages of at least 3 carbon atoms between ether, ester, or esteramide linkages (to avoid water sensitivity), be saturated, and contain primary or secondary OH termination, more preferably primary OH termination. Instead of using mixtures of polyesters and polyethers etc., these materials or mixtures of dicarboxylic acids and polyether glycols and the like may be reacted together to form a composite polyether-ester polyol. Mixtures of the various polyols disclosed herein such as polyethers, polyesters, polyetheresters, and polyesteramides can be used in the practice of the present invention.

The polyether, ester, etherester or esteramide polyol should have an average molecular weight of at least about 600 to obtain products with some elastomeric characteristics, preferably they should have an average molecular weight of at least 1,000. The upper limit of the average molecular weight can be as high as 6,000; however, it is preferred that the upper limit be about 4,000.

If the polyethers, polyesters, etc. are impure or contain traces of catalysts etc. which would tend to speed their reaction with polyisocyanates where fast reactions are not wanted, they may be washed or otherwise treated to reduce this activity. The polyisocyanates may be recrystallized to distilled to purify them.

In some polyurethane prepolymer formulations it is desirable to use chain extenders and/or crosslinking materials to increase viscosity, strength and so forth. They may contain from 2 up to 8 or more reactive hydroxyl radicals. Low molecular weight polyols can be used which are highly branched such as a reaction product of glycerol and propylene oxide, or hexane triol and propylene oxide, and the other polyols mentioned above. Still other materials which can be used as crosslinkers are pentaerythritol, glycol, glycerol, trimethylol propane, phenyl trimethylol methane, 1,2,4-butanetriol, 1,1,1-trimethylol hexane, pentaerythritol monooleate, 1,4-butanediol, 1,2,6-hexane triol, propanol amine, ethylene diamine, butanol amine, hexanolamine, diethanol amine, triethanol amine, N,N,N',N'-tetrakis (2-hydroxy-propyl) ethylene diamine, ortho-chloromethylene dianiline, "Hyprose SP-80" (the reaction product of a sucrose with 8 equivalents of propylene oxide to give a compound having 36 carbon atoms and eight reactive hydroxyl groups-Dow Chemical Company) and the like. Mixture of these materials are useful. Only minor amounts of these materials need be useful. Generally from about 0.1 to 1.2% by weight of the chain extender or crosslinker is employed based on the weight of the final prepolymer.

The polyisocyanate used in preparing the prepolymer may be any organic polyisocyanate having 2, 3 or more functional or reactive isocyanato groups and being an aromatic, aliphatic or aliphatic-aromatic compound. The same polyisocyanates may be used as disclosed supra for reaction with the bituminous substances. Mixtures of the polyisocyanates can be used. A preferred class of diisocyanates to use including the tolylene diisocyanates has the general formula:

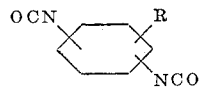

where R is selected from the group consisting of hydrogen, methyl, ethyl, propyl, isopropyl, butyl, amyl, hexyl, and the other lower molecular weight alkyl radicals. Other preferred isocyanates are MDI and polyarylene polyisocyanates such as Mondur MR. When isocyanates like the last named are used, their polyfunctionality necessitates special care to prevent sufficient cross-linking to gel the prepolymer.

Sufficient organic polyisocyanate is employed both to react with all of the active hydrogen atoms (hydroxyl and/or amino and carboxyl, if any) of the polyols and crosslinker and to provide an isocyanate terminated polyurethane prepolymer having from about 0.1 to 10% by weight free isocyanate (NCO available for reaction) based on the weight of the prepolymer. Preferred prepolymers have a free isocyanato content of from about 0.5 to 4.0% by weight. The polyols, crosslinker if used, and the polyisocyanate are reacted together to give polyurethane prepolymers having average molecular weights of from at least 2500 up to 50,000 or 60,000 or more. Preferably, for ease in handling and mixing with the bituminous isocyanate adduct and to obtain the best properties in the sealant, the condensation reaction is carried out to get a polyurethane prepolymer having an average molecular weight of from about 4,000 to 25,000.

The prepolymers are prepared according to procedures well known to the art. For example, they are reacted under an atmosphere free of water vapor or other material reactive with isocyanato groups. Dry nitrogen is the most convenient. Temperatures and times for reaction will depend on the volume of materials used, the reactivity of the reactants and, the desired molecular weight of the prepolymer and so forth. Temperatures, however, should not be above about 150° C. Cooling may be necessary to control any exothermic heat of reaction. Solvents are sometimes desirably added to improve mixing of the ingredients and facilitate the reaction, etc.

If it is desired to slow down the polyurethane forming reaction, such acid reacting substance as benzoyl chloride may be added. Conversely, if it is desired to speed the reaction, such polyurethane catalysts as the tertiary amines (triethylamine, triethylenediamine, N-methyl morpholine etc.), are useful. Still other catalysts known to the art can be used such as cobalt, tin, lead and uranium salts of carboxylic acids, of naphthenic acids, the beta diketones of these metals, the phenates of these metals, and the alkyl acetyl acetate derivatives of these metals, for example, stannous octoate, stannous oleate, lead naphthenate, lead salicylate etc. Such tetravalent tin compounds as dibutyl tin dilaurate, dibutyl tin maleate and other tetravalent tin compounds known to the art which have at least one direct carbon to tin bond can be used. Other catalysts can be used such as the carboxylic acid salt, the naphthenic acid salt, the phenate, the beta diketone, the alkyl acetyl acetate of beryllium, calcium, magnesium, zinc and other metals of Group II. Still other well known polyurethane catalysts can be used. Mixtures of catalysts are useful. The catalyst is used in an amount sufficient to speed the reaction and generally in an amount of from about 0.05 to 3 parts by weight based on 100 parts by weight of the polyol employed.

THE SEALANT COMPOSITION

A sufficient amount of the polyurethane prepolymer is used with the bituminous-isocyanate adduct to give a composition when cured having an elongation capacity greater than 100%. Generally, one part by weight of the polyurethane prepolymer is mixed with from about 0.20 to 6.70 parts by weight of the bituminous-isocyanate adduct. Mixing is conducted in a suitable container in the absence of water or water vapor and preferably under an inert atmosphere as described above. When solvents are not employed, heat may be used to melt the prepolymer or adduct to increase their fluidity to facilitate mixing or blending. The resulting sealant composition exhibits a useful shelf life of over a year in the absence of moisture. It is also possible to prepare the mixture in situ. For instance, prepolymer can be prepared and then sufficient excess isocyanate added to react with the bitumen, which is added to the mixture.

After mixing prepolymer and adduct, there is a reaction between them which causes the free isocyanate content to decline for a few days. This seems to improve the composition by providing better compatibility of the constituents of the prepolymer and the adduct. With coke oven tars, a small amount of water improves compatibility. As a result, the properties of the cured product from aged mixtures are better than those from unaged mixtures.

The quality of the cured product can be measured by the mechanical properties (strength, elongation, and work-to-break) of the sealant composition itself and of a joint made between two pieces of concrete by said composition, especially when the latter is immersed in water after curing. Adhesion can be measured by determining peel strength and shear strength. Joints made from the sealant composition of the present invention are unexpectedly better than joints made from the prepolymer itself, the bituminous substance itself or the bituminous-isocyanate adduct. Moreover a feature of the composition of the present invention is that it does not otherwise have to be treated or mixed with any other material at the place of application.

Pigments and other additives can be added to the sealant of the present invention or to the prepolymer or adduct used to make the sealant. Examples of such materials are carbon black, $TiO_2$, $SiO_2$ containing materials like calcium silicate, silica, and the aerosils, wood flour, metal flakes, organic and inorganic natural or synthetic fibers (wool, cellulose, nylon, polyester, glass, asbestos, etc.

(surface treated or not)), iron oxide, zinc oxide, color pigments and dyes such as the phthalocyanine pigments, antioxidants, antiozonants, deodorants, fungicides, plasticizers, rubbers, resins, silicones or siloxane polymers and copolymers, fire retardants such as antimony oxide, Arochlor, chlorinated paraffins, and so forth. Examples of antioxidants which can be added are alkyl substituted phenols, N,N'-dialkyl substituted phenylene diamines, alkyl and aryl phosphites, halogenated organic phosphites and so forth. Some pigments serve specific purposes, i.e., asbestos fibers having a length up to about ½ inch prevent sagging while carbon black protects against ultraviolet light and serves to reinforce the sealant. The antioxidants and pigments used for color are used only in small amounts sufficient to protect or color the sealant. The pigments used as reinforcing agents may be employed in amounts of 30 to 60 parts by weight per 100 parts of the sealant. When pigments are used as extenders or fillers, they may be employed in amounts of up to 200 or 300 parts by weight per 100 parts by weight of the sealant. Often times, it is best to add the pigment, if it contains active hydrogen or groups containing active hydrogen, to the isocyanate, polyisocyanate or polyisocyanate solution before these isocyanates are reacted with the polyol or bituminous substance. In this way reactive groups on the pigment are satisfied and gelation is avoided. However, the pigments etc. can be added to the sealant itself. While pigments may be dehydrated prior to addition to either of the ingredients or to the sealant, it is preferred to add them to the isocyanate or polyisocyanate in the manner indicated herein.

A very useful material to add to the sealant composition to improve its adhesion to silicous surfaces such as glass (window, plate, automobile windshields, glass blocks, etc.) or to metallic surfaces (iron, steel, zinc, lead, aluminum, copper, tin, nickel, cobalt, silver, magnesium and so forth and their alloys) is an organic silane having from two to three alkoxy or hydroxy groups and from one to two organic groups terminated with a functional group (amino, epoxy, or isocyanate) or radical which is reactive with an isocyanate, urethane, urea, hydroxyl, carboxyl, amino, thio or other reactive group of the sealant, the bituminous-adduct and/or the polyurethane prepolymer. Examples of such materials are γ-amino propyl triethoxy silane, β(3,4-epoxy cyclo hexyl) ethyl trimethoxy silane, γ-glycidoxy propyl trimethoxy silane, the reaction product of 1 mol of tolylene diisocyanate isomer mixture (80/20, 2,4-/2,6-tolylene diisocyanate) and 1 mol of γ-amino propyl triethoxy silane and so forth. Other materials which can be used are

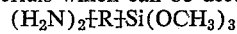

where R is an alkylene group,

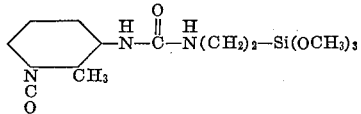

etc. Similar silane or siloxane dimers, trimers, tetramers and so forth can also be used. A general formula for such compounds is $X_n(-Y-)_m(OR)_p$ where X is a radical selected from the group consisting of isocyanate, amino and epoxy groups, where R is H or an alkyl radical of from 1 to 10 carbon atoms, where $n$ is a number from 1 to 2, where $p$ is a number from 2 to 3, where $m$ is an integer depending on the valence of Y, and Y is the organic silicon moiety. The silane is used in an amount of from about 0.05 to 2.0 parts by weight per 100 parts by weight of said sealant composition.

Solvents which are efficacious are aromatic hydrocarbons such as toluene, xylene, and Solvesso 100; moisture free esters such as the ester of the monoether of ethylene glycol such as "cellosolve acetate"; anhydrous, water insoluble ketones, and other water insoluble polar solvents, which do not have active hydrogens and preferably which are volatile. Sufficient solvent is employed to obtain a solution or dispersion of the desired fluidity for proper mixing, handling, application and so forth.

The bituminous adduct—polyurethane prepolymer composition of the present invention is readily cast between cement or concrete joints and allowed to dry to evaporate the solvent if any and to cure in air by action of water vapor or moisture. It can be used in the same way as a tile setting grout, for lining clay or concrete pipe or as a flexible adhesive for metal, as a coating and waterproofing. The present composition can be used as a caulking material and sealant for architectural work or for such appliances as home freezers, automobile bodies and so forth.

Special curing agents are not needed although they can be added for special purposes. For example, organic peroxides can be used or sulfur and accelerators where the polyurethane prepolymer has ethylenic unsaturation. Water in small amounts can be added to the mixture at the place of use to cause foaming; however, this is not too desirable if the use of heating and mixing equipment is objectionable.

The following examples will serve to illustrate the present invention with more particularity to those skilled in the art:

*Example I.—Preparation of polyesterurethane prepolymer containing reactive NCO groups*

To 440 g. of TDI (a mixture of 80/20, 2,4-/2,6-tolylene diisocyanates in all of the examples) there were added slowly under an atmosphere of dry nitrogen and under good agitation, 3500 g. of Multron R-16, an unbranched, hydroxy terminated polyethylene adipate with hydroxyl number equal to about 41–47 mg. of KOH/gram. The mixture was maintained at 90° C. during the addition. The mixture was then held for three hours at 90° C. while agitating it to obtain a liquid prepolymer.

*Example II.—Preparation of caster oil polyurethane prepolymer made with TDI*

1044 g. of TDI and 157 g. of Solvesso 100 (a proprietary petroleum hydrocarbon with 90% aromatic content, boiling range of 317–350° F. and K–B No. of 89) were charged to a glass reactor having an atmosphere of dry $N_2$. There were slowly added 2100 g. of DB caster oil (urethane grade, moisture free) to the reactor while maintaining a temperature of 70° C. and while agitating. The mixture was then maintained at this temperature while agitating and under a $N_2$ atmosphere for two hours to obtain a prepolymer having reactive NCO groups.

*Example III.—Preparation of trifunctional prepolymer made with TDI*

522 g. of TDI were put in a reactor having an atmosphere of dry nitrogen. There were then added slowly 2160 g. of the triol made by reacting propylene oxide with trimethylol propane (hydroxyl number 40, Union Carbide LHT-42) and 121 g. of Solvesso 100, while agitating and while maintaining a temperature of 80° C. The resulting mass was held for three hours at this temperature.

*Example IV.—Preparation of tetrafunction polyurethane prepolymer made with TDI*

To a mixture of 261 g. of TDI and 145 g. of Solvesso 100, in a reactor with agitation and under an atmosphere of dry nitrogen, there were slowly added 2160 g. of LHT-42, while maintaining a temperature of 80° C. The mixture was held for two hours at this temperature. Then there were added 510 g. of the glycol made by reacting propylene oxide with enough propylene glycol to produce a diol with a hydroxyl number of about 55. The mixture was then held at 80° C. for two hours under nitrogen.

Example V.—High NCO polyether

Multrathane F-84 (Mobay Chem. Co.), an isocyanate terminated polyetherurethane prepolymer which is a light colored, thin liquid at room temperature. NCO content 6.7–7.3%; equivalent weight: 575–623; viscosity at 25° C.; 13,000–18,000 centipoises; and specific gravity 25/25° C.: 1.06 (approx).

Example VI.—Preparation of MOCA extended polyetherurethane prepolymer

To 765 g. of MDI (4,4'-methylene bis(phenyl isocyanate)) and 580 g. of TDI dissolved in 600 g. of Solvesso 100, in a reactor maintained at 80° C. under an atmosphere of dry nitrogen and under good agitation, there were added slowly 8640 g. of LHT-42 triol. The mixture was held for two hours at 80° C. Then there were dissolved 68.5 g. of methylene - bis - orthochloroaniline (MOCA) in 1530 g. of polypropylene ether glycol PPG 2025 (MW-2000) which were added slowly to the reactor. The resulting mass was held for two hours maintaining the above conditions.

Example VII.—Barrett roofing pitch adduct

Dissolve 750 g. MDI in 750 g. Solvesso 100. Raise to 160° F. Add, slowly, 8960 g. of Allied Chemical B.S. Pitch (coke oven coal tar pitch with R. & B. melting point 135–140° F.) dissolved in 1500 g. Solvesso 100. Heat is 180–190° F. Hold for two hours.

Example VIII

One part of each of the prepolymer compositions of Examples I–VI was mixed with two parts of the pitch adduct composition of Example VII to form a sealant composition.

Tensile properties were determined as follows: Liquid sealants were poured into open topped molds 1/8" deep. The sheets were allowed to cure for one week at room conditions. ASTM D638 type II tensile specimens were punched out and tensile properties determined in an Instron Tester operated at 20 inches per minute.

The adhesion of the material to a wet joint was tested as follows:

TEST FOR ADHESION TO CONCRETE JOINTS

A 1/4" x 1" x 1" plate of polyethylene was inserted the waist of an ASTM C-190 tensile briquette mold. The remaining space was filled with a 1:2:3 (cement: sand: aggregate—parts by weight) concrete made with 6 gallons of water per sack of type I cement. These were allowed to cure one month in a moist cabinet and then the surface was dressed with a grinding wheel, washed, and allowed to dry. Mating halves are inserted in the C-190 molds. 1/16" x 1/4" x 1" rectangular prisms of stainless steel coated with a cured silicone varnish were inserted between the briquette halves, which were then filled with sealant. After curing one week under ambient conditions, the briquettes were immersed three days in water. While still wet, they were placed in the jaws of an Instron Tester, whose jaws separated at a rate of 0.2 inch/minute. From the stress strain curve was obtained bond strength and elongation at rupture. "Work to break" is approximately one half the product of the strength and elongation which, to a first approximation, is the area under the stress-strain curve.

Similar tests were conducted in which the pitch adduct was omitted, and the results are shown in Table I, below:

TABLE I

| Run No. | Polyurethane of Ex. | Pitch Adduct of Ex. | Mechanical Properties | | | | | | Adhesion of Wet Cement Joints | | | | | |
|---|---|---|---|---|---|---|---|---|---|---|---|---|---|---|
| | | | Strength [1] | | Elongation [2] | | Work [3] | | Strength [1] | | Elongation [2] | | Work [3] | |
| | | | A [4] | WP [5] | A [4] | WP [5] | A [4] | WP [5] | A [4] | WP [5] | A [4] | WP [5] | A [4] | WP [5] |
| 1 | I | VII | 681 | 68 | 150 | 204 | 500 | 69 | 0 | 4 | 0 | 41 | 0 | 1.6 |
| 2 | II | VII | | | | | | | 0 | 133 | 0 | 25 | 0 | 17 |
| 3 | III | VII | 384 | 314 | 41 | 54 | 81 | 85 | 141 | 96 | 25 | 20 | 17.6 | 9.6 |
| 4 | IV | VII | 304 | 232 | 288 | 140 | 162 | 116 | 28 | 63 | 25 | 58 | 3.5 | 18.2 |
| 5 | V | VII | | 318 | | 25 | | | 132 | 144 | 63 | 97 | 42 | 70 |
| 6 | VI | VII | 522 | 366 | 252 | 166 | 657 | 303 | 132 | 148 | 38 | 91 | 26 | 67 |

[1] P.s.i. at break.
[2] Percent elongation at break.
[3] In.-lbs./cu.in.
[4] A = Polyurethane prepolymer alone.
[5] WP = Polyurethane prepolymer with pitch adduct.

The results as shown in the above table indicate that the mechanical properties exhibited by compositions containing the polyurethane prepolymer and pitch adduct were not as good generally as the mechanical properties exhibited by the prepolymer itself. However, on testing the adhesion of wet cement joints, the properties of the polyurethane prepolymer pitch adduct compositions were very much better than those exhibited by the polyurethane prepolymers themselves. Moreover, the compositions containing polyether urethanes were better than those containing polyesterurethanes and the polyethers of higher branching gave even better results.

Example IX.—Asphalt isocyanate adduct

Transphalt T110 is a polymerized aromatic residue from petroleum cracking. Its melting point is 110° C. 254 g. of Transphalt T110 were dissolved in 41 g. of Solvesso 100. This mixture was added to 9.1 g. of MDI dissolved in 9 g. of Solvesso 100. Temperature of the resulting mass was maintained at 80° C. for two hours in a sealed erlenmeyer flask which was stirred by a magnetic stirrer.

Example X.—Tall oil pitch isocyanate adduct

Tall oil pitch (TOP) is the residue from the distillation of tall oil. It is a paste at room temperature. Its acid number is 29.6 mg. of KOH/gram.

33.0 g. of MDI were dissolved in 43.0 g. of Solvesso 100 in an erlenmeyer flask held at 80° C. 214 g. of the TOP were added to the flask. The flask was sealed and agitated with a magnetic stirrer, and the temperature was held at 80° C. for two hours.

Example XI.—Air blown petroleum distillate isocyanate adduct

Byerlite 2794A is an air blown petroleum distillate having a ring and ball softening point of 165°–175° F., a penetration of 85.

29.0 g. of MDI was dissolved in 29.0 of Solvesso 100 in an erlenmeyer flask held at 80° C. 240 g. of Byerlite 2794A were dissolved in 29 g. of Solvesso 110 and added slowly to the flask at this temperature with agitation.

Example XII.—Coal tar pitch isocyanate adduct

CP-250 is a low phenol coal tar pitch with Engler sp. visc. at 100° C. of 6.5–6.8, 20% distillate to 300° C., a residue softening point of 40°–60° C. and 0.0% of water.

10.8 g. of MDI were dissolved in 10.8 g. of Solvesso 100 in an erlenmeyer flask with magnetic agitation, at a temperature of 70° C. While maintaining this temperature, 230 g. of CP-250 in 36 g. of Solvesso 100 were added to the flask which was then held at this temperature for two hours.

Example XIII.—Coal tar isocyanate adduct

CP-524 is a low phenol content coal tar, 30% distills off at 300° C., the softening point of its residue is 35°–

55° C. and it has 0.5% of water. It is made by distilling off the lower boiling fractions and replacing them with anthracene (neutral) oil.

236 g. of MDI were dissolved in 236 g. of Solvesso 100 held at 70° C. under good agitation and under an atmosphere of nitrogen in a reactor. 3300 g. of CP–524 were added slowly to the reactor, and the mass held for two hours while maintaining the above conditions.

*Example XIV.—Gilsonite isocyanate adduct*

Zeco 11A is a Gilsonite Select supplied by G. S. Ziegler & Co. Its melting point is 300° F. and penetration is 0. 180 g. of this gilsonite were dissolved in 180 g. of CP–524 (the coal tar of Example XIII above).

98.5 g. of MDI were dissolved in 72 g. of Solvesso 100, with the temperature being held at 70° C. with agitation and under a nitrogen atmosphere in a reactor. The solution of the gilsonite in the CP–524 was added slowly to the reactor which was then held for two hours, maintaining the above conditions.

*Example XV*

Mixtures of the polyetherurethane prepolymer composition of Example VI, above, and the bituminous isocyanate adduct compositions of Examples VII and IX to XIV were prepared and tested according to the procedure of Example VIII, above, except that the "work to break" property was not calculated.

Additionally, tests were made in which the compositions were cast between dry cement blocks to test the dry adhesion of the compositions. The results obtained on the test are shown in Table II, below.

The above results show that while many bituminous substances can be adducted with isocyanates and then mixed with polyetherurethane prepolymers to give useful sealants, the best ones to employ are the low phenol type bitumens as shown by Examples XII and XIII. It was found that to insure compatibility, it was beneficial to mix about 0.5% of water with the bitumen of Example XII.

*Example XVI*

Compositions were prepared of bituminous adducts of TDI and MDI and blended or mixed with the polyetherurethane prepolymer composition of Example VI, dried, cured and tested according to the procedure of Example VIII, above. The results of the tests are shown in Table III, below.

The results shown in Table III indicate that compositions having bituminous adducts made with 4,4'methylene bis (phenyl isocyanate) gave better wet adhesion to concrete than did compositions in which the bituminous adducts were made with tolylene diisocyanate.

*Example XVII*

Compositions were prepared in which the amount of bituminous isocyanate adduct (the pitch-isocyanate adduct composition of Example VII, above) was gradually increased as compared to the amount of polyurethane composition (polyetherurethane polymer of Example VI, above). These blends or mixtures were dried, cured and tested as to their mechanical properties and wet concrete adhesion properties according to the method of Example VIII, above. The results obtained on test are shown in Table IV below.

The results obtained as shown by this example indicate that the bituminous isocyanate adduct imparts improved mechanical and adhesive properties to the polyurethane propolymer and that optimum properties are obtained

TABLE II

| Run No. | Bituminous Isocyanate Adduct, Ex. | Wt. ratio Bituminous Isocyanate Adduct/Polyurethane [1] | Mechanical Properties | | Adhesion in a Dry Concrete Joint | | Adhesion in a Wet Concrete Joint | |
|---|---|---|---|---|---|---|---|---|
| | | | Str.[2] | Elong.[3] | Str.[2] | Elong.[3] | Str.[2] | Elong.[3] |
| 10 | VII | 2/1 | | | 194 | 95 | 140 | 120 |
| 11 | IX | 2/1 | 171 | 56 | 119 | 59 | 91 | 41 |
| 12 | X | 1/1 | | | 43 | 32 | 18 | 19 |
| 13 | X | 2/1 | 158 | 149 | 46 | 39 | 34 | 28 |
| 14 | XI | 2/1 | | | 28 | 71 | 16 | 97 |
| 15 | XI | 1/1 | 321 | 137 | 144 | 182 | 97 | 72 |
| 16 | XII | 2/1 | 215 | 297 | 95 | 183 | 79 | 279 |
| 17 | XIII | 2/1 | 205 | 570 | 81 | 292 | 61 | 504 |
| 18 | XIV | 1/1 | 284 | 74 | 154 | 83 | 143 | 81 |

[1] Parts by weight.  [2] P.s.i. at break.  [3] Percent elongation at break.

TABLE III

| Run No. | Type of Bituminous Isocyanate Adduct | Ratio of Bituminous Isocyanate Adduct/Polyetherurethane Prepolymer [1] | Dry Adhesion | | | Wet Adhesion | | |
|---|---|---|---|---|---|---|---|---|
| | | | Str.[2] | Elong.[3] | Work[4] | Str.[2] | Elong.[3] | Work[4] |
| 20 | Pitch-MDI (Example VII) | 1:1 | 178 | 82 | 73 | 134 | 52 | 38 |
| 21 | Pitch-TDI (Example VII, used molar equivalent TDI instead of MDI) | 1:1 | 205 | 149 | 154 | 102 | 52 | 27 |
| 22 | Tar-MDI (Example XIII) | 2:1 | 44 | 300 | 66 | 56 | 660 | 185 |
| 23 | Tar-MDI [5] | 2:1 | 111 | 160 | 88 | 53 | 48 | 13 |

[1] Parts by weight.
[2] P.s.i. at break
[3] Percent elongation at break.
[4] In.-lbs./cu.in.
[5] 783 g. of TDI were dissolved in 580 g. of Solvesso 100 in a reactor. The mixture was heated to 80° C. under N₂ and agitated. Next, there were added 10,800 g. of CP–524 (the low phenol coal tar of Example XIII) to the diisocyanate solution while agitating. Then the resulting mass was held under these conditions for 2 hours.

TABLE IV

| Run No. | Ratio of Bituminous Isocyanate Adduct to Polyetherurethane Prepolymer [1] | Mechanical Properties | | | Adhesion, Wet Concrete | | |
|---|---|---|---|---|---|---|---|
| | | Str.[2] | Elong.[3] | Work[4] | Str.[2] | Elong.[3] | Work[4] |
| 30 | 0/1 | 193 | 133 | 129 | 72 | 48 | 19 |
| 31 | .33/1 | 248 | 178 | 220 | 149 | 58 | 47 |
| 32 | 1.00/1 | 305 | 175 | 268 | 134 | 52 | 35 |
| 33 | 2.00/1 | 110 | 132 | 112 | 109 | 55 | 29 |
| 34 | 3.00/1 | 196 | 94 | 92 | 84 | 70 | 29 |
| 35 | 5.68/1 | 172 | 18 | 15 | 61 | 25 | 7 |
| 36 | 9.00/1 | | Too brittle to test | | 42 | 23 | 6 |

[1] Parts by weight.  [2] P.s.i. at break.  [3] Percent elongation at break.  [4] In.-lbs./cu. in.

with sealant compositions having about equal parts of the adduct of Example VII and prepolymer. On the other hand at about 9 parts of the adduct to 1 part of the prepolymer, the properties of the resulting composition are generally too poor to enable the material to be used satisfactorily as a sealant. Hence, too much adduct or the use of only the adduct gives unsatisfactory results.

*Example XVIII*

Sealant compositions were prepared by blending or mixing together the MDI adduct composition of the low phenol coal tar of Example XIII, above, and the polyetherurethane prepolymer composition of Example VI, above, in various proportions. The compositions were then dried, cured and tested according to the procedure of Example VIII, above. The results of tests on these compositions are shown below in Table V:

held at 180° F., 4,000 g. of RT-6, a road tar made to comply with ASTM specification D490-47 (which has a maximum distillation of 35% at 300° C. and whose residue has a softening point of 35-70° C.) are added. The batch is held, with agitation, at 180° F. for two hours.

*Example XIXa*

187 g. of MDI ared issolved in 347 g. of Solvesso 100. The solution is heated to 180° F., 2,000 g. of RT-6 which has been dehydrated by a Dean-Stark distillation is added. The temperature is held at 180° F. for two hours.

*Example XIXb*

187 g. of MDI is dissolved in 300 g. of Solvesso 100. The solution is heated to 180° F., 3,500 g. of CP-524

TABLE V

| Run No. | Ratio of Bituminous Isocyanate Adduct to Polyetherurethane Prepolymer [1] | Mechanical Properties | | | Dry Concrete Joint | | | Wet Concrete Joint | | | Percent Adh. Break [5] |
|---|---|---|---|---|---|---|---|---|---|---|---|
| | | Str.[2] | Elong.[3] | Work[4] | Str.[2] | Elong.[3] | Work[4] | Str.[2] | Elong.[3] | Work[4] | |
| 40 | 0.33/1 | 184 | 123 | 113 | 143 | 108 | 77 | 109 | 81 | 45 | 100 |
| 41 | 1.00/1 | 226 | 245 | 275 | 119 | 144 | 86 | 101 | 140 | 71 | 30 |
| 42 | 2.00/1 | 309 | 710 | 1,096 | 78 | 313 | 122 | 72 | 376 | 136 | 0 |
| 43 | 3.00/1 | 185 | 790 | 730 | 41 | 431 | 89 | 49 | 619 | 154 | 0 |
| 44 | 4.00/1 | 83 | 900 | 373 | 24 | 632 | 76 | 30 | 867 | 130 | 0 |
| 45 | 5.00/1 | 59 | 716 | 214 | 7 | 342 | 14 | 5 | 270 | 8 | 0 |
| 46 | 6.00/1 | 38 | 590 | 112 | 5 | 395 | 12 | 5 | 300 | 9 | 0 |
| 47 | 7.00/1 | Too weak to test | | | 1 | 160 | 8 | Fell apart | | | |

[1] Parts by weight.
[2] P.s.i. at break.
[3] Percent elongation at break.
[4] In.-lbs/cu. in.
[5] Percent of break (wet concrete joint) which occurred in sealant (adhesive).

The results of this example show that the adhesive and mechanical properties of a sealant containing only the polyfunctional polyurethane (highly branched, functionality of 4 or higher, a preferred species) are greatly improved by using the low phenol coal tar-MDI adduct with it. The best adhesive properties using the polyfunctional urethane prepolymer appear to be attained when the ratio of the adduct to this prepolymer is about three to one.

*Example XIX*

374 g. of MDI are dissolved in 187 g. of Solvesso 100 which has been dehydrated by a Dean-Stark distillation is added. The temperature is held at 180° F. for two hours.

*Example XIXc*

Sealant compositions were prepared by blending or mixing together various bituminous materials or various compositions of isocyanate adduct of bituminous materials and various polyurethane prepolymer compositions. The resulting blends were dried, cured and tested according to the method of Example VIII, above. The results are shown in Table VI, below:

TABLE VI

| Run No. | Prepolymer | Bitumen or Bitumen Adduct | Parts by Weight Ratio Prepolymer to Adduct | Viscosity After Aging 48 Hours at 60° C. | Mechanical Properties | | Adhesion in a Wet Concrete Joint | |
|---|---|---|---|---|---|---|---|---|
| | | | | | Strength | Elongation | Strength | Elongation |
| 50 | Example III | Natural RT-6 | 1:0.5 | 14,000 | 135 | 99 | 73 | 115 |
| 50 | do | do | 1:1 | 85,000 | 163 | 236 | 74 | 115 |
| 51 | do | do | 1:2 | Gel | | | | |
| 52 | do | Example XIX | From 1:0.5 to 1:2 | | Didn't cure | | | |
| 53 & 54 | do | CP-524 | 1:0.5 | Gel | | | | |
| 55 | do | CP-524 | 1:1.0 | Gel | | | | |
| 56 | do | CP-524 | 1:2 | Gel | | | | |
| 57 | do | Example XIII | 1:2 | 25,000 | | | 48 | 689 |
| 58 | Example IV | RT-6 | 1:0.5 | Gel | | | | |
| 59 | do | RT-6 | 1:1 | Gel | | | | |
| 60 | do | RT-6 | 1:2 | Gel | | | 37 | 283 |
| 61 | do | Ex. XIX | 1:2 | 140,000 | | | | |
| 62 | do | Dehydrated RT-6 | 1:0.5 | 18,600 | Didn't cure | | | |
| 63 | Example IV | Dehydrated RT-6 | 1:1.0 | 54,500 | Didn't Cure | | | |
| 64 | do | Ex. XIXa | 1:0.5 | 10,600 | 188 | 358 | 73 | 71 |
| 65 | do | Ex. XIXa | 1:1.0 | 8,300 | 155 | 637 | 52 | 438 |
| 66 | do | Ex. XIXa | 1:2.0 | Incompatible | | | | |
| 67 | do | CP-524 | 1:0.5 | Gel | | | | |
| 68 | Example IV | CP-524 | 1:1 | Gel | | | | |
| 69 | do | CP-524 | 1:2 | Gel | | | | |
| 70 | do | E. XIII | 1:2 | 140,000 | 219 | 940 | 56 | 660 |
| 71 | do | Dehydrated CP-524 | 1:0.5 | 52,000 | Didn't Cure | | | |
| 72 | do | do | 1:2.0 | 32,000 | | | | |
| 73 | do | Ex. XIXb | 1:0.5 | 28,800 | 115 | 157 | 53 | 64 |
| 74 | do | Ex. XIXb | 1:2.5 | 33,000 | 166 | 754 | 33 | 180 |
| 75 | do | Barrett Roofing Pitch. | 1:0.5 | Gel | | | | |

The results indicate that when a trifunctional urethane prepolymer is mixed with an ordinary road tar which contains a large amount of low boiling phenols, it will not gel unless the ratio of tar to prepolymer exceeds 1:1. However, the elongation capacity of the wet concrete joint is not adequate for most purposes.

The mixture of a tetrafunctional prepolymer with this tar in any proportion will gel and is unsatisfactory for this reason.

If an isocyanate adduct is produced from this high phenol tar and two parts are mixed with one part of trifunctional prepolymer, it will not gel, but it also will not cure. However, when two parts of this adduct are mixed with one part of a tetrafunctional prepolymer, it will not gel and it will cure to produce a fairly good joint.

In the case of the preferred low phenol tar, mixing it in any proportion with a tri or tetrafunctional prepolymer will produce a gel. However, if this tar is first adducted with MDI and two parts of this isocyanate adduct are mixed with one part of either a tri or tetrafunctional prepolymer, the mixture will not gel in the can, but on exposure to the atmosphere will cure to form an excellent joint for concrete.

The results further indicate that if either of these low boiling bitumens is dehydrated and mixed with a urethane prepolymer, while, on the one hand it will not gel the prepolymer, on the other hand the mixture will not be moisture curing.

The results also indicate that if either of these bitumens is dehydrated, and an MDI adduct made from it, and this adduct mixed with the prepolymer, the mixture will cure. It has been found, however, that adducts of dehydrated bitumens tend to become incompatible with prepolymers and, when mixed, form a chunky precipitate.

The results also show that high boiling bitumens, epitomized by Barrett Roofing Pitch, will gel when mixed in almost any proportion, with a urethane prepolymer, despite the fact that they contain no water. Thus, it is clear that to produce a one package bitumen modified urethane material useful for making satisfactory concrete joints it is necessary to have a polyurethane prepolymer and an isocyanate adduct of the bituminous substance.

Example XX 2400 parts by weight (1.14 mol) of polypropylene ether glycol (average mol wt. about 2025, PPG-2025) were mixed with 318 parts by weight of Solvesso 100 and 1.4 parts by weight of dibutyl tin dilaurate in a glass reactor under dry nitrogen. The mixture was then agitated and 174 parts by weight (1 mol) of TDI were added to the reactor rapidly with agitation, the resulting mass being held at room temperature. The material in the reactor was then heated to 80° C. and held at this temperature for one hour. The material was then cooled to room temperature and 168 parts by weight (1 equiv.) of Mondur MR (a polyisocyanate material having an NCO functionality of from about 2 to 6 (average about 3) and 31% free isocyanate which is made by reacting phosgene with the reaction product of aniline and formaldehyde) were added to the reactor with agitation. Heat was applied to raise the temperature of the materials in the reactor to 80° C. and the resulting material in the reactor was maintained at 80° C. for two hours under agitation to obtain a polyetherurethane prepolymer. 1 part of this polyetherurethane composition was then mixed with 3 parts of the low phenol content coal tar-MDI adduct composition of Example XIII, parts being by weight, to form a sealant composition. Portions of the sealant composition were then mixed with small amounts of various silanes, cast on glass plates, dry and wet with water, allowed to dry and cure and then their peel strengths were measured. The results of the tests are shown in Table VII, below:

TABLE VII

| Run No. | Amount of Sealant, g. | Type of Silane | Amount of Silane in g. (50 % solids in cellosolve acetate) | Peel strength [1] from glass, lbs./in. | |
|---|---|---|---|---|---|
| | | | | Dry | Wet |
| 80 | 500 | None (control) | | 0 | 0 |
| 81 | 500 | (CH$_2$=CH)SiCl$_3$ | 2.5 | 3 | 0 |
| 82 | 500 | Reaction product of 1 mol of TDI with 1 mol of γ-amino propyl triethoxy silane. | 9 | 22 | 21 |
| 83 | 1,000 | Diphenyl diethoxy silane | 5 | 4 | 2 |
| 84 | 1,000 | γ-methacryloxypropyl trimethoxysilane | 5 | 5 | 6 |
| 85 | 1,000 | O⟨ S ⟩—CH$_2$—CH$_2$—Si(OCH$_3$)$_3$ | 5 | 12 | 12 |
| 86 | 1,000 | CH$_2$—CH—CH$_2$—O—CH$_2$—CH$_2$—CH$_2$Si(OCH$_3$)$_3$ | 5 | 17 | 15 |
| 87 | 1,000 | NH$_2$—CH$_2$—CH$_2$—CH$_2$—Si(OCH$_3$)$_3$ | 5 | 10 | 10 |

[1] ASTM Method D 903-49.

The results of this example show that by adding to the sealant composition a small amount of a silane having 2 or 3 alkoxy groups and one or two organic groups which are terminated with a function which can react with one or more of the organic ingredients of the sealant composition, the adhesion of the sealant to glass can be greatly improved. The above table shows that the best material tested contained the reaction product of TDI and γ-amino propyl triethoxy silane although the compositions having β(3,4-epoxy cyclo hexyl) ethyl trimethoxy silane and γ-glycidoxy propyl trimethoxy silane also gave good adhesions.

Example XXI 210 g. of Mondur MR (see Example XX, above) is dissolved in 250 g. of Solvesso 100 in a reactor under dry N$_2$. The mixture is then heated to 70° C. with agitation while 1866 g. of a low phenol content coal tar (CP-524, Example XIII, above) is added, and the batch is held for one hour under these conditions. One part by weight of the polyurethane prepolymer composition of Example XX, above, is then mixed with 3 parts by weight of the bituminous-adduct composition of this example. The resulting blend is then cast between wet concrete joints, allowed to dry and cure. On test, the joint showed a bond strength of 46 p.s.i. and an elongation at break of 538%.

Example XXII

A one gallon glass reactor was charged with 990 g. of a 2,000 molecular weight polypropylene glycol (PPG 2025), 16 g. of N-t-butyl diethanolamine and 0.1 ml. dibutyl tindilaurate (T-12) under an atmosphere of dry nitrogen. Temperature was raised to 160° F. and 87 g. of TDI dissolved in 120 g. of Solvesso 100 was slowly added to the well agitated reaction mass. It was then held at 175° F. for one hour. The mass was cooled to 120° F. and 80 g. of Mondur MR were added rapidly with good agitation.

The mass was heated to 175° F. and held at this temperature for 2 hours. To promote package stability, a very small quantity of benzoyl chloride can be added.

Example XXIII 24 g. of crude xylenol were mixed with 240 g. of Aroclor 1260, a chlorinated diphenyl with about 60% chlorine and viscosity of 3200–4500 seconds Saybolt Universal.

Example XXIV

To make a synthetic tar 20 g. of high boiling tar acids (equivalent weight of dehydrated acids 222) and 20 g. of crude xylenol were added to a solution of 37 g. of MDI in 324 g. of Aroclor 1260 and 80 g. of xylol and contained a total of 0.1% H₂O by weight kept at 170° F. in a well agitated glass reactor under an atmosphere of dry nitrogen. The reaction mass was held at a temperature of 180° F. for two hours.

Example XXV

In a glass reaction flask under an atmosphere of dry nitrogen with 324 g. of Cumar P-10 (a cumarone-indene polymer with softening point 7–16° C., Iodine No. 44), 40 g. of xylol and 40 g. of high boiling tar acids was held at 175° F. with good agitation. 45 g. of MDI dissolved in 40 g. of xylol was added. Held at 175° F. for two hours.

Example XXVI

In a well agitated glass reactor under an atmosphere of dry nitrogen there were dissolved in 260 g. of Cumar P-10, 65 g. of Aroclor 5460 (a chlorinated diphenyl with chlorine content of 61%, a melting point of 98–105.5%) 40 g. of tar acids (see Example XXIV above) and 40 g. of xylene. Heated to 175° F. Added slowly 45 g. of MDI. Held at 175° F. for two hours.

Example XXVII

There were dispersed in 300 g. of a mixture of 400 g. of Example XXII with 500 g. of Example XXV, 60 g. of dehydrated zinc oxide, 60 g. of dehydrated calcined Georgia clay (RER-45) and 15 g. of a 30% solution of the adduct of one mole of TDI with one mole of aminopropyl triethoxysilane. Dispersion was conducted under an atmosphere of dry nitrogen.

Example XXVIII

The prepolymer of Example XXII, above, was then mixed with certain adducts and extenders including those of Examples XXIII to XXVI and the resulting compositions tested as to wet and dry adhesion of concrete joints as discussed supra. The results obtained including those of Example XXVII are shown in Table VIII, below:

Run numbers 90, 91, 92 and 93 in Table VIII show that if a urethane prepolymer is plasticized with any of the common plasticizers, it will not make a very good joint sealant, either because its elongation capacity in the joint is too low, or because its bond strength is too low.

Run 94 in this same table shows that if a tar acid is added to a low elongation plasticizer, the elongation capacity increases to the point where the compound has more elongation capacity than is required, but the bond strength is at the same time reduced so much that the sealant is little stronger than an uncured viscous liquid. The result here is similar to that obtained with dehydrated tar which has not been adducted.

Run 95 shows that if tar acid is adducted with MDI, while dissolved in a common plasticizer, a satisfactory sealant is produced.

A cumarone indene polymer is ordinarily incompatible with a polyurethane prepolymer. But runs 96, 97 and 98 show that when tar acid is dissolved in such a hydrocarbon and then adducted with MDI, they produce in combination with a urethane prepolymer, an excellent joint sealant.

Run 99 shows that when these sealants are pigmented with conventional pigments and fillers, the properties are surprisingly better than those of an unpigmented sealant with the same vehicle composition.

It is understood that in accordance with patent law, the particular form of compositions or products shown and described and the particular procedures set forth are presented for purposes of explanation and illustration and that various modifications of said compositions, products and procedures can be made without departing from this invention.

What is claimed is:

1. A composition comprising 1 part by weight of an isocyanate terminated polyurethane prepolymer and from about 0.20 to 6.70 parts by weight of an isocyanate adduct of a mixture of a member of the group consisting of viscous through solid, high boiling, polymeric, aromatic and polycyclic hydrocarbons and chlorinated derivatives of the same, with at least one phenol boiling between 195° and 340° C., said composition when cured having an elongation greater than 100%.

2. A composition according to claim 1 wherein (a) said prepolymer has from about 0.1 to 10% by weight of free isocyanato groups and an average molecular weight of from about 2,500 to 60,000 and (b) said isocyanate adduct has not over about 2.0% by weight of free isocyanoto groups.

3. A composition according to claim 2 wherein (a) said prepolymer is the reaction product of an excess of organic polyisocyanate having from 2 to 3 isocyanato groups and an essentially hydroxyl terminated polyol selected from the group consisting of polyalkylene ether polyols, polyester polyols, polyesteramide polyols and polyether amide polyols having an average molecular weight of from about 1000 to 4000 and (b) said isocyanate adduct is the reaction product of an organic isocyanate having from 1 to 3 isocyanato groups and a bituminous substance comprising an unmodified tar acid and having a small amount, up to 1.0% by weight, of water,

TABLE VIII

| Run No. | Parts Prepolymer Ex. XXII | Parts Adduct or Extender | Type Adduct or Extender | Concrete Joint | | | |
|---|---|---|---|---|---|---|---|
| | | | | Dry Adhesion | | Wet Adhesion | |
| | | | | Strength, p.s.i. | Elongation, Percent | Strength, p.s.i. | Elongation, Percent |
| 90 | 100 | 50 | 8N8 [1] | 4 | 1,225 | 5 | 1,070 |
| 91 | 100 | 50 | Tricresyl Phosphate | 52 | 107 | 28 | 60 |
| 92 | 100 | 50 | HB 40 (partially hydrogenated terphenyls) | 50 | 88 | 32 | 65 |
| 93 | 100 | 100 | Aroclor 1260 | 36 | 160 | 27 | 112 |
| 94 | 100 | 100 | Ex. XXIII | 6 | 537 | 7 | 411 |
| 95 | 400 | 500 | Ex. XXIV | 23 | 349 | 23 | 269 |
| 96 | 400 | 500 | Ex. XXV | 66 | 399 | 35 | 496 |
| 97 | 100 | 200 | Ex. XXV | 38 | 738 | 32 | 683 |
| 98 | 100 | 200 | Ex. XXVI | 27 | 1,007 | 27 | 860 |
| 99 | | | Example XXVII | 102 | 532 | 95 | 561 |

[1] 2,2′(2-ethyl hexylamido) diethyl di(2-ethyl hexoate).

whereby said adduct contains labile arylurethane groups formed by reaction of a phenol and an isocyanate.

4. A composition according to claim 3 wherein said polyurethane prepolymer has an average molecular weight of from about 4,000 to 25,000, and said organic polyisocyanate to be reacted with said bituminous substance is selected from the group consisting of hydrocarbons and hydrocarbons containing from 1 to 4 halogen atoms and having from 6 to 18 carbon atoms in a chain between the isocyanato groups.

5. A composition according to claim 1 containing additionally from about 0.05 to 2.0 parts by weight per 100 total parts by weight of said prepolymer and said adduct of an organic silane having (a) from 2 to 3 radicals selected from the class consisting of hydroxyl and alkoxy radicals and (b) from 1 to 2 radicals selected from the class consisting of amino, epoxy and isocyanato radicals.

6. A composition according to claim 1 containing additionally from about 30 to 60 parts by weight of asbestos fibers based on 100 parts total by weight of said prepolymer and said adduct.

7. A composition comprising 1 part by weight of an isocyanate terminated polyurethane prepolymer and from about 0.20 to 6.70 parts by weight of an isocyanate adduct of a bituminous substance containing unmodified tar acids and a small amount, up to 1% by weight, of water and which composition has been cured with $H_2O$ vapor.

8. An article of manufacture comprising at least two slabs of cementitious material and disposed between and in contact with said slabs a sealant comprising 1 part by weight of an isocyanate terminated polyurethane prepolymer and from about 0.20 to 6.70 parts by weight of an isocyanate adduct of a bituminous substance, containing unmodified tar acids, whereby said adduct contains labile arylurethane groups formed by reaction of phenol and said isocyanate, said prepolymer being formed before its mixture with said adduct.

9. An article of manufacture according to claim 8 wherein (a) said prepolymer has from about 0.1 to 10% by weight of free isocyanato groups and an average molecular weight of from about 2,500 to 60,000 and (b) said isocyanate adduct of said bituminous substance having not over about 2% by weight of free isocyanato groups.

10. An article of manufacture according to claim 8 wherein (a) said prepolymer is the reaction product of an excess of organic polyisocyanate having from 2 to 3 isocyanato groups and an essentially hydroxyl terminated polyol selected from the group consisting of polyalkylene ether polyols, polyester polyols, polyesteramide polyols and polyetheramide polyols having an average molecular weight of from about 1000 to 4000 and (b) said isocyanate adduct of said bituminous substance is the reaction product of an organic isocyanate having from 1 to 3 isocyanato groups and a bituminous substance having a small amount, up to 1.0% by weight, of $H_2O$.

11. An article of manufacture according to claim 10 wherein said polyurethane prepolymer has an average molecular weight of from about 4,000 to 25,000, and said organic polyisocyanate to be reacted with said bituminous substance is selected from the group consisting of hydrocarbons and hydrocarbons containing from 1 to 4 halogen atoms and having from 6 to 18 carbon atoms in a chain between the isocyanato groups.

12. An article of manufacture according to claim 8 in which said sealant contains additionally from about 0.05 to 2.0 parts by weight per 100 total parts by weight of said prepolymer and said adduct of an organic silane having (a) from 2 to 3 radicals selected from the class consisting of hydroxyl and alkoxy radicals and (b) from 1 to 2 radicals selected from the class consisting of amino, epoxy and isocyanato radicals.

13. An article of manufacture according to claim 8 in which said sealant contains additionally from about 30 to 60 parts by weight of asbestos fibers based on 100 total parts by weight of said prepolymer and said adduct.

14. An article of manufacture comprising at least two slabs of cementitious material and disposed between and in contact with said slabs a sealant comprising 1 part by weight of an isocyanate terminated polyurethane prepolymer and from about 0.20 to 6.70 parts by weight of an isocyanate adduct of a bituminous substance and a mixture of phenols which has been cured with $H_2O$.

15. A floor tile comprising individually separated particles of stony material bound in a matrix comprising 1 part by weight of an isocyanate terminated polyurethane prepolymer and from about 0.20 to 6.70 parts by weight of an isocyanate adduct of a bituminous substance, which contained unmodified tar acids when contacted with the isocyanate, said matrix being cured in the presence of $H_2O$.

16. A laminate comprising two layers of glass secured together at least along a portion of their inner edges by an interposed layer of a sealant composition comprising 1 part by weight of an isocyanate terminated polyurethane prepolymer, from about 0.20 to 6.70 parts by weight of an isocyanate adduct of a bituminous substance, which comprised unmodified tar acids when contacted with isocyanate, and from about 0.05 to 2.0 parts by weight based on 100 total parts by weight of said prepolymer and said adduct of an organic silane having (a) from 2 to 3 radicals selected from the class consisting of hydroxyl and alkoxy radicals and (b) from 1 to 2 radicals selected from the class consisting of amino, epoxy and isocyanato radicals.

17. An article of manufacture comprising a glass member, a metallic member for holding said glass member, and a sealant disposed between a portion of said glass member and said metallic member to adhere said members together, said sealant comprising 1 part by weight of a isocyanate terminated polyurethane prepolymer, from about 0.20 to 6.70 parts by weight of an isocyanate adduct of a bituminous substance, which adduct includes the reaction product of an isocyanate and an unmodified tar acid and from about 0.05 to 2.0 parts by weight based on 100 total parts by weight of said prepolymer and said adduct of an organic silane having (a) from 2 to 3 radicals selected from the group consisting of hydroxyl and alkoxy radicals and (b) from 1 to 2 radicals selected from the group consisting of amino, epoxy and isocyanato radicals.

18. A laminate comprising two layers of metal secured together at least for a portion of their areas by means of an intermediate layer of a sealant comprising 1 part by weight of a polyurethane prepolymer, from about 0.20 to 6.70 parts by weight of an isocyanate adduct of a bituminous substance, said adduct including a reaction product of excess polyisocyanate and unmodified tar acids, a solvent, soluble polymeric, aromatic hydrocarbon, and a small amount of water, and from about 0.05 to 2.0 parts by weight based on 100 total parts by weight of said prepolymer and said adduct of an organic silane having (a) from 2 to 3 radicals selected from the class consisting of hydroxyl and alkoxy radicals and (b) from 1 to 2 radicals selected from the class consisting of amino, epoxy and isocyanato radicals.

19. The method of forming a composition useful as a sealant which comprises reacting an organic isocyanate with a bituminous substance comprising unmodified tar acids and up to 1% by weight of water to form an isocyanate adduct of said bituminous substance and then mixing said adduct with an isocyanate terminated, polyurethane prepolymer, said adduct being used in an amount of from about 0.20 to 6.70 parts by weight and said prepolymer being used in an amount of 1 part by weight.

20. A composition according to claim 1 wherein said adduct is an adduct of a polyisocyanate with an aromatic solvent-soluble aromatic resin, a small amount, up to 1% by weight thereof, of water, and a mixture of phenols boiling between 195° and 340° C., whereby said adduct comprises labile arylurethane groups.

References Cited

UNITED STATES PATENTS

| | | | |
|---|---|---|---|
| 3,038,873 | 6/1962 | Lawrence | 260—2.5 |
| 3,092,594 | 6/1963 | Heiss | 260—2.5 |
| 3,136,732 | 6/1964 | Kaestner et al. | 260—2.5 |
| 3,211,674 | 10/1965 | Sandridge | 260—2.5 |
| 3,219,516 | 11/1965 | Cobbledick | 161—190 |
| 3,179,610 | 4/1965 | Wood | 260—28 |
| 3,182,032 | 5/1965 | Charlton et al. | 260—28 |

OTHER REFERENCES

Damusis, A., et al.: Polyether Urethane Elastic Sealants, Industrial and Engineering Chem., Products Research and Development, vol. 1, No. 4, December 1962 pp. 269–274.

Heiss, H. L.: Rubber Age, vol. 88, 1960, October, pages 89–97.

Saunders-Frisch: High Polymers, vol. 2, Polyurethanes, 1964, pages 776–780, 800 reprint of 1962, Mobay Chem. Co., Bulletin Published in 1964, Interscience, N.Y.

EARL M. BERGERT, *Primary Examiner.*

C. B. COSBY, *Examiner.*